US010952082B2

(12) United States Patent
Gódor et al.

(10) Patent No.: US 10,952,082 B2
(45) Date of Patent: Mar. 16, 2021

(54) SYSTEM AND METHOD FOR ANALYZING NETWORK PERFORMANCE DATA (71) Applicant: Telefonaktiebolaget LM Ericsson (publ), Stockholm (SE)

(72) Inventors: István Gódor, Budapest (HU); Nóra Fenyvesi, Budapest (HU); Zsófia Kallus, Budapest (HU); József Stéger, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/474,130

(22) PCT Filed: Jan. 26, 2017

(86) PCT No.: PCT/EP2017/051658
§ 371 (c)(1),
(2) Date: Jun. 27, 2019

(87) PCT Pub. No.: WO2018/137765
PCT Pub. Date: Aug. 2, 2018

(65) Prior Publication Data
US 2019/0320329 A1 Oct. 17, 2019

(51) Int. Cl.
*H04W 16/22* (2009.01)
*H04L 12/24* (2006.01)
(Continued)

(52) U.S. Cl.
CPC .......... *H04W 16/22* (2013.01); *H04L 41/147* (2013.01); *H04L 41/22* (2013.01);
(Continued)

(58) Field of Classification Search
CPC .............. G06F 11/3476; G06F 11/079; G06F 11/0793; H04L 41/16; H04L 43/0876;
(Continued)

(56) References Cited

U.S. PATENT DOCUMENTS

2006/0010101 A1* 1/2006 Suzuki ................ G06F 11/3452
2006/0294231 A1* 12/2006 Blencowe ............... H04L 63/02
709/224

(Continued)

FOREIGN PATENT DOCUMENTS

EP 1577783 A1 * 9/2005 ......... H04L 41/0631
EP 1577783 A1 9/2005

OTHER PUBLICATIONS

Eagle, N. et al., "Reality mining: sensing complex social systems", Personal and Ubiquitous Computing, vol. 10, Nov. 3, 2005, pp. 255-268, Springer-Verlag.

(Continued)

*Primary Examiner* — Matthew C Sams
(74) *Attorney, Agent, or Firm* — Coats + Bennett, PLLC (57) ABSTRACT A computer system and computer-automated method for analyzing performance data in a telecommunications network. A data set is provided that contains a log of a first time sequence of network events which are classified into event types. A second time sequence is generated from the first time sequence by aggregating the events into event groups, and at least a third time sequence is generated by aggregating the event groups into event super-groups. A multi-level time sequence event hierarchy of at least three levels is thus created. The multiple time sequence levels are rendered into a visualization in which the different event types are visually distinct from each other. The visualization reveals to a domain expert patterns of behavior in the data set which can be used to detect current network problems and to predict future network loading, for example in a network operations center.

19 Claims, 6 Drawing Sheets

(51) Int. Cl.
*H04L 12/26* (2006.01)
*H04W 16/18* (2009.01)
*H04W 24/08* (2009.01)

(52) U.S. Cl.
CPC ...... *H04L 41/5012* (2013.01); *H04L 43/0876* (2013.01); *H04W 16/18* (2013.01); *H04W 24/08* (2013.01); *H04L 41/16* (2013.01)

(58) Field of Classification Search
CPC .... H04L 47/822; H04L 47/823; H04W 16/18; H04W 16/22; H04W 24/08; H04W 28/08; H04W 4/029; H04W 64/00
See application file for complete search history.

(56) References Cited

U.S. PATENT DOCUMENTS

| | | |
|---|---|---|
| 2011/0214020 A1 | 9/2011 | Caspi et al. |
| 2012/0064956 A1 | 3/2012 | Das et al. |
| 2012/0198346 A1 | 8/2012 | Clemm et al. |
| 2013/0080617 A1* | 3/2013 | Driesen ................. H04L 47/823 709/224 |
| 2013/0262656 A1 | 10/2013 | Cao et al. |
| 2013/0317944 A1* | 11/2013 | Huang .................. G01S 5/0263 705/26.61 |
| 2014/0344698 A1 | 11/2014 | Hohteri et al. |
| 2014/0379895 A1 | 12/2014 | Jain |
| 2015/0248917 A1 | 9/2015 | Chang et al. |
| 2016/0035115 A1 | 2/2016 | Krajec |
| 2016/0071548 A1 | 3/2016 | House et al. |
| 2016/0182321 A1 | 6/2016 | Broda et al. |
| 2016/0335260 A1* | 11/2016 | Convertino ......... G06F 16/2358 |
| 2019/0318651 A1* | 10/2019 | Fenyvesi ............ G09B 19/0038 |
| 2019/0320329 A1* | 10/2019 | Godor ................. H04L 41/5012 |

OTHER PUBLICATIONS

González, M. et al., "Understanding Individual Human Mobility Patterns", Nature International Journal of Science, vol. 453, Jun. 5, 2008, pp. 779-782, Nature Publishing Group.

Grauwin, S. et al., "Towards a Comparative Science of Cities: Using Mobile Traffic Records in New York, London and Hong Kong", Computational Approaches for Urban Environments, Oct. 1, 2014, pp. 1-24, Springer.

Kondor, D. et al., "A Tale of Many Cities—Visualizing Signatures of Human Activity in Cities Across the Globe", Landscape Architecture Frontiers, vol. 3 No. 3, Jun. 1, 2015, pp. 54-61, Higher Education Press.

Godor, I. et al., "The Signatures of City Life", Ericsson Mobility Report, Nov. 1, 2014, pp. 28-29, Ericsson.

Godor, I. et al., "The Digital Signatures of Sport", Ericsson Mobility Report, Jun. 1, 2015, pp. 20-23, Ericsson.

* cited by examiner

SYSTEM AND METHOD FOR ANALYZING NETWORK PERFORMANCE DATA

TECHNICAL FIELD

The present disclosure relates to analyzing, visualizing and acting on network performance data.

BACKGROUND

It is known to analyze telecommunications usage data in order to understand the spatial and temporal dynamics within a network. Network operation centers (NOC) are places where such analysis takes place. The analysis is based on logging events occurring on the network and processing them to identify current network problems and to predict future ones. NOCs in future may also use complex analytics of 'big data' collected from large pools of users who have been manually or automatically profiled.

In Eagle and Pentland "Reality mining: sensing complex social systems" Personal and ubiquitous computing, vol. 10(4) pages 255-268 (2006) it was shown that mobile phone activity patterns of university students could be decomposed into regular daily routines, and that these routines were linked to each student's subject and employment levels.

Building on this work in Gonzalez, Hidalgo and Barabasi "Understanding individual human mobility patterns" Nature, vol. 453 pages 779-782 (2008) the trajectory of 100,000 anonymized mobile phone users was studied to reveal statistical regularities in human movement patterns.

More recent studies in this area include:

S. Grauwin, S. Sobolevsky, S. Moritz, I. Gódor, C. Ratti—Towards a comparative science of cities: using mobile traffic records in New York, London and Hong Kong, Computational Approaches for Urban Environments, Springer, pages 363-387 (2015)

D. Kondor, P. Thebault, S. Grauwin, I. Gódor, S. Moritz, S. Sobolevsky, C. Ratti—A Tale of Many Cities—Visualizing Signatures of Human Activity in Cities Across the Globe, Landscape Architecture Frontiers, vol 3/3, pages 54-61, June 2015

I. Gódor, Z. Kallus, D. Kondor, S. Grauwin, S. Sobolevsky—The Signatures of City Life, Ericsson Mobility Report, pages 28-29, November 2014

I. Gódor, P. Jonsson, Z. Kallus, D. Kondor—The Digital Signatures of Sport, Ericsson Mobility Report, pages 20-23, June 2015

NOCs can apply complex analytics to telecommunications usage data collected from user equipments and other network entities. Usage data may include traditional voice calls, traditional text (SMS) messages, data upload and download, social media usage (Twitter, Facebook, WhatsApp etc.). In this context, a mobile phone or other user equipment effectively acts as a monitoring device through its modes of use and associated sensor data which it collects, such as GPS location, photographs or videos.

For analysis, at one extreme, expert domain knowledge can be hard-coded into fixed algorithms with fixed parameter settings. At the other extreme, fully automatic, data-driven algorithms with machine learning can be used to analyze the usage data. Experts have gained a deep understanding of the processes involved from experience, so that for example an expert is able to detect early signs of a forthcoming network overload from the processed usage data. This is useful, since appropriate maintenance actions can be undertaken to provision additional network resource to avoid the predicted overload. However, analysis to find the root cause of network problems is a difficult task, even for domain, i.e. subject matter, experts. The reason why this is a difficult problem is that patterns relating to different respective problems can overlap each other and it is difficult to extract an exact timing sequence of events which is characteristic of a given kind of network problem. Moreover, the data set being analyzed may be incomplete. For example, some data may have been lost, or, in the case of real-time monitoring, the event may still be unfolding.

Ultimately, the results of such analysis need to be included in a reporting system for automated actions, alerts and real-time feed-back for decision makers or various end-users. The goal of end-users is not only acknowledgment of events occurring in the system but also searching for new patterns that can provide new algorithmic solutions or trigger singular actions. As new domains of analytics see new, more sophisticated ways of detecting events new ways of presenting results become a necessity as the end-user should be able to benefit from such analytical results without requiring a difficult learning curve.

SUMMARY

According to a first aspect of the disclosure there is provided a computer-automated method for analyzing network performance data, the method comprising:

receiving a data set containing a log of a first time sequence of network events in which each network event is associated with at least one network location and has been classified into one of a plurality of event types;

creating a second time sequence from the first time sequence by aggregating the events into event groups, wherein each event group is defined as a plurality of events which are in a specific sequence of event types, each event group being classified into one of a plurality of event group types;

creating a third time sequence from the second time sequence by aggregating the event groups into event super-groups, wherein each event super-group is defined as a plurality of event groups which are in a specific sequence of event group types, each event super-group being classified into one of a plurality of event super-group types; and rendering into a visualization any desired permutation of the first time sequence, the second time sequence, the third time sequence and any further, higher order time sequences such that in the visualization each of said types is visually distinct from other types in the same time sequence.

According to a second aspect of the disclosure there is provided a computer system for performing the method of the first aspect, that is a computer system for analyzing network performance data. The computer system comprises:

a data input operable to receive a data set containing a log of a first time sequence of network events in which each network event is associated with at least one network location and has been classified into one of a plurality of event types;

a memory operable to store the data set;

a processor operable to analyze the data set; and an output operable to output the visualization to a display.

The processor is operable to analyze the data set through performing the actions of:

(i) creating a second time sequence from the first time sequence by aggregating the events into event groups, wherein each event group is defined as a plurality of events which are in a specific sequence of event types, each event group being classified into one of a plurality of event group types;

(ii) creating a third time sequence from the second time sequence by aggregating the event groups into event super-groups, wherein each event super-group is defined as a plurality of event groups which are in a specific sequence of event group types, each event super-group being classified into one of a plurality of event super-group types; and (iii) rendering into a visualization any desired permutation of the first time sequence, the second time sequence, the third time sequence and any further, higher order time sequences such that in the visualization each of said types is visually distinct from other types in the same time sequence.

Through the multi-level hierarchical analysis, comprising three or more levels, and through the visualization, the hierarchy of events becomes intuitively visibly trackable to a domain expert who is able to recognize basic, mid and top level patterns of the data in the visualization. The method and computer system can take advantage of complex levels and granularity of measurement feeds, since network performance is visualized in terms of event patterns rather than individual events. Events can be visualized which come from a single source stream, or from several parallel streams (e.g. several cells in a cellular network). Network problems can be recognized because the multi-level hierarchical analysis combined with the visualization allows expert's brains to recognize missing information elements and variance of delays between individual events. Specifically a domain expert is able to interpret the visualization of the mid and top level time sequences, even of incomplete data sets, to separate out patterns relating to different respective problems which overlap, which then allows an exact timing sequence of event types to be recognized as being characteristic of a given kind of network problem. Experts can feed this information to machine learning (ML) functionalities to extend automatic problem detection features of the network operation system.

It will be appreciated that fourth and further higher order time sequences can be created in the same way as the recited second time sequence is created from the first time sequence, and the third time sequence is created from the second. That is an nth order time sequence can be created from an (n−1)th order time sequence by aggregating and classifying, so that the analysis levels can be built up ad infinitum to any desired level. Specifically, the method or computer system may further comprise creating at least one higher order, nth time sequence from the previous highest order, (n−1)th time sequence by aggregating the groups of the previous highest order, referred to as sub-ordinate groups, into supra-ordinate groups, wherein each supra-ordinate group is defined as a plurality of sub-ordinate groups which are in a specific sequence of sub-ordinate group types, each supra-ordinate group being classified into one of a plurality of event supra-ordinate group types.

Moreover, other embodiments may terminate the analysis at the second order time sequence, so not include a third order time sequence. In other words, a computer-automated method can be provided for analyzing network performance data, in which the method comprises: receiving a data set containing a log of a first time sequence of network events in which each network event is associated with at least one network location and has been classified into one of a plurality of event types; creating a second time sequence from the first time sequence by aggregating the events into event groups, wherein each event group is defined as a plurality of events which are in a specific sequence of event types, each event group being classified into one of a plurality of event group types; and rendering into a visualization the first time sequence and/or the second time sequence such that in the visualization each of said types is visually distinct from other types in the same time sequence. A corresponding computer system for performing this method may also be provided.

The proposed method and system can also be integrated into existing monitoring methods and systems extended with streamed data processed by real-time analytics for visual monitoring of events.

The network events may each be specific to one or more particular network entities, such as a user equipment, a cell, a base station. Moreover, the network events may each be specific to a particular application, such as a social media application or messaging application.

The network location(s) associated with each event may be for example: UE location, participating transmitter/receiver network entity location or mobile cell, location derived from a photograph or video clip uploaded to the network by a social media application or to a cloud service configured to act as a repository for photographs or video clips.

An event is defined or characterized by a specific pattern being present in the measured or deduced timeline of the monitored system. This definition applies at each hierarchical analysis level. An event may be any event defined by the method or system for collection into the data set, in particular events known or thought to have relevance for network performance. An event may be defined by an expert, or be defined automatically as part of the present or a previous analysis. A simple event might be a type of usage, e.g. a sending a message via SMS or a social media application, uploading a photograph or video clip, downloading email, making a voice call. A more complex event may be a peak in UE (User Equipment) usage for a particular class of user, such a peak in email activity as measured by usage of an email application, or a peak in downloading/watching videos which could be measured in terms of the application(s) being used, e.g. YouTube, Catch up TV application, or file type (MPEG4).

Further example events amenable for analysis and visualization according to the proposed methods and systems are: number of users per cell, data traffic load, signaling load, cell CPU load, and cell I/O load.

In some embodiments, the visualization includes a map representation of events in relation to their network locations and according to at least one of the second time sequence and the third time sequence.

In some embodiments the analysis further comprises recognizing a pattern in the data set by matching the current event groups and/or super-groups to a first time period of at least one stored data set in which the same event groups and/or super-groups are present. In this way, it can be predicted how events may develop with reference to a second time period of the matched stored data set or sets, wherein the second time period follows the first time period. In particular, future network loading can be predicted based on warping, i.e. applying a warp transform to, the first time period of the at least one stored data set onto the current data set and using the warped second time period of the at least one stored data set as the prediction. For example, if there is a security alert at an inner city location, the network loading can be monitored in real-time, and historical data can be analyzed from 'false-alarm' security alerts and 'real' security alerts, in order to deduce whether the current security alert is a false alarm, e.g. from a security services practice event or movie filming, or is based on a real adverse event, such as a shooting or bomb explosion.

The visualization may include a map representation of the predicted future network loading. This map representation of the prediction may be integrated in or separate from a map representation of the data set being analyzed.

The map representation(s), i.e. the map representation of the analyzed data set or the prediction, may encode time with one of: color or shading in a single image frame; or such that separate image frames relate to specific times or periods of time which can be displayed in time order.

The map representation(s) may be to scale of a real geographical map, or may be a schematic representation of a network diagram showing nodes or entities of the network and their interconnections and/or juxtaposition, e.g. network cells.

In some embodiments, user actuatable controls may be provided for modifying the map representation to filter in and out based on at least one of event types, event group types, and event super-group types. User actuatable controls may also be provided for the visualization of at least one of the first time sequences, the second time sequence and the third time sequence to filter in and out based on at least one of event types, event group types, and event super-group types respectively.

Changing the visualizations, including the map representation by adjusting the settings of the user actuatable controls may also be used to predict future network loading. Namely, predicting future network loading can be based on applying said user actuatable controls to filter out at least some of the events contained in the data set. A modified version of the data set can then be saved, with the events which have been filtered out from the visualization being removed, i.e. not saved, so that the saved events are those that have been selected by the user actuatable controls and the filters they represent.

The predicted future network loading can be used to provision additional resource on the network in order to mitigate the possibility of overloading. Namely, the predicted future network loading can be compared to existing network capacity to predict if any capacity shortfalls are likely to occur. If they are, then action can be taken automatically or by manual intervention to provision additional network capacity to address any such capacity shortfalls before they are predicted to occur.

The network location can be a geographical location and/or an association with a network entity in a network diagram.

The event group types can be pre-defined, or defined as part of the analysis, or a combination of both. When defined as part of the analysis, the event group types can be defined as part of creating the second time sequence from the first time sequence and according to the first time sequence.

To assist defining the event group types, the event location could be used (e.g. UE/IP address at residential address, UE/IP address at business address), or data identifying demographics of the user (e.g. student, office worker) which could be obtained from contract data or analytics of movement and usage.

The event super-group types may also either be pre-defined or defined as part of the analysis, or a combination of both. When defined as part of the analysis, the event super-group types can be defined as part of creating the third time sequence from the second time sequence and according to the second time sequence.

In the visualization, the different types in each time series should be represented in a way in which a user can easily distinguish between them. Namely, in each time series each type is ascribed a different visual characteristic for the visualization, for example a different color picked from a color chart. Moreover, in some embodiments, each event is ascribed a value of a quality parameter, which may be a continuously variable scalar parameter which can adopt a value within a particular range. The is quality parameter is represented in the visualization such that the range of the quality parameter values is represented by a range of values of a visualization parameter. For example, if different colors are used to distinguish different types, then color saturation could be used as the visualization parameter. Alternatively, luminosity or brightness could be used according to the HSL (Hue-Saturation-Lightness) or HSB (Hue-Saturation-Brightness) color representations respectively. Another alternative would be to use opacity as the visualization parameter. The visualization can be performed by a custom graphical user interface (GUI) which receives the time series which processes the time series data to present images in a timeline which have any one or more of the following attributes: real-time, animated, searchable, zoomable in and out in time and/or space (which may be real space or space in a network topology of interlinked nodes), contain icons for elements that are linked to a particular location, contain alert messages.

Using the method and computer system as described, the kinds of occurrences that can be monitored and analyzed are for example: morning/evening rush hour on a work day/Saturday/Sunday, lunch period on a work day/Saturday/Sunday, stadium usage event for sport/concert on a work day/evening or Saturday daytime/evening or Sunday daytime/evening.

According to a further aspect of the disclosure there is provided a computer program stored on a computer readable medium and loadable into the internal memory of a computer, comprising software code portions, when said program is run on a computer, for performing the method of the fifth aspect. A computer program product may also be provided for storing the computer program.

BRIEF DESCRIPTION OF THE DRAWINGS

The embodiments of the present disclosure presented herein are described herein below with reference to the accompanying drawings.

DETAILED DESCRIPTION

In the following description, for purposes of explanation and not limitation, specific details are set forth (such as particular method steps) in order to provide a thorough understanding of the technique presented herein. It will be apparent to one skilled in the art that the present technique may be practiced in other embodiments that depart from these specific details. For example, while the following embodiments will be described with reference to mobile networks, e.g. 4G or 5G, it will be appreciated that the technique presented herein is not limited to data collected from any type of cellular network access. Moreover, it is noted that other embodiments may relate to and include new radio (NR) networks.

Those skilled in the art will further appreciate that the services, functions and steps explained herein may be implemented using software functioning in conjunction with a programmed microprocessor, or using an Application Specific Integrated Circuit (ASIC), a Digital Signal Processor (DSP), a field programmable gate array (FPGA) or general purpose computer. It will also be appreciated that while the following embodiments are described in the context of methods and systems, the technique presented herein may also be embodied in a computer program product as well as in a system comprising a computer processor and a memory coupled to the processor, wherein the memory is encoded with one or more programs that execute the services, functions and steps disclosed herein.

Memory may comprise any known computer-readable storage medium, which is described below. In one implementation, cache memory elements of memory provide temporary storage of at least some program code (e.g., program code) in order to reduce the number of times code needs to be retrieved from bulk storage while instructions of the program code are carried out. Moreover, similar to CPU, memory may reside at a single physical location, comprising one or more types of data storage, or be distributed across a plurality of physical systems in various forms.

Certain terms used in the following detailed description of exemplary embodiments are defined as follows:

4G: is the fourth generation of mobile telecommunications technology as defined by the ITU (International Telecommunication Union) in IMT (International Mobile Telecommunication system) Advanced, such as LTE.

5G: is the fifth generation of mobile telecommunications and wireless technology which is not yet fully defined, but in an advanced draft stage, e.g. in 3GPP TS 23.401 version 13.6.1 Release 13 of May 2016. For the purposes of this document LTE is considered to include 5G.

LTE: Long-Term Evolution

UA: is part of a UE and acts as a client in a transport protocol (TP) for communication with a server.

UE: is a terminal that resides with the user which hosts a UA.

WiFi: is an environment and interface allowing an electronic device, such as a UE, to wirelessly connect to, and form part of, a wireless LAN (WLAN). Currently, WiFi mainly uses 2.4 GHz and 5 GHz frequency bands.

The proposed computer system is able to operate as a standalone entity taking a data set as input, i.e. the raw network measurements, and presenting its analysis as a visualization on a display that is part of the computer system and/or outputting the rendered data in a format suitable presenting the visualization on an external display. In a standalone implementation, the computer system will include one or more of the following features: a data collection interface for inputting the data; data integration functionalities for domain-specific parameters; and a graphical user interface possibly having different implementation variants for different display devices. The details of these additions are well known to a person skilled in the art.

The proposed computer system is also suitable to be integrated into an existing reporting and analytics computer system.

Figure 1:
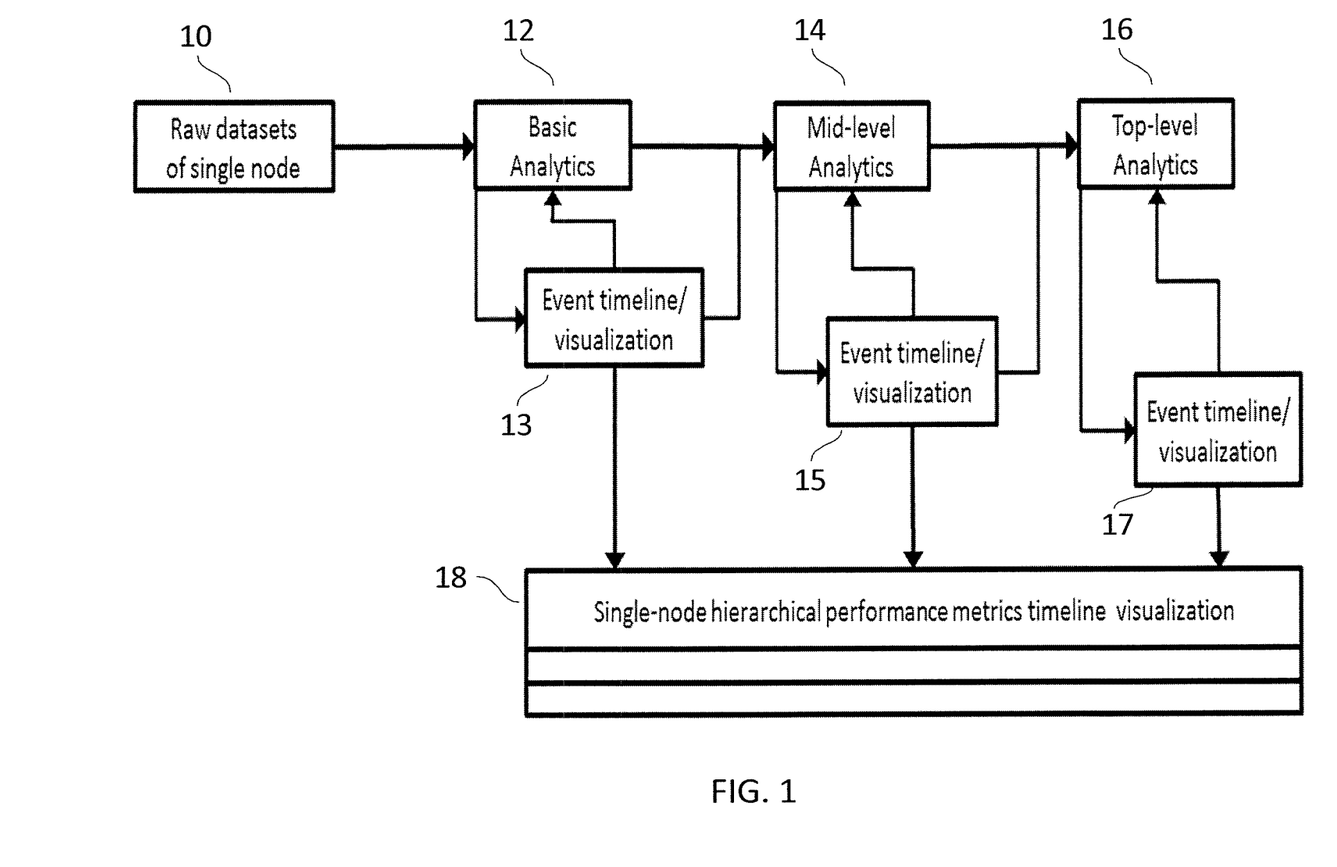
FIG. 1 shows a multi-level hierarchical analytics and visualization method and to system as envisaged by embodiments of the disclosure.

FIG. 1 shows a multi-level implementation of hierarchical analytics and visualization method and system as envisaged by embodiments of the disclosure. In the illustrated example, there are three analytics levels, but it will be appreciated from the following that four, five, six or more analytic levels could be provided following the teachings provided.

In input module 10 receives a number of raw data sets, one from each node, which collectively constitute an input data set for analysis. The input data set contains, for each of a plurality of network entities, a log of a first time sequence of events. (A time sequence of events may be referred to as a timeline elsewhere in this document.) Each network event is logged such that it is associated with one or more network locations, e.g. by being associated with a network entity such as a user equipment or cell.

Basic analytics are applied by a bottom-level, basic analytics module 12 to classify the events into one of a plurality of event types. The basic events timeline is rendered in a bottom-level visualization module 13 by the method into a visualization which may be displayed to a user via a graphical user interface.

Mid-level analytics are then applied by a mid-level analytics module 14 which has the role of creating a second time sequence from the first time sequence obtained from the basis analytics by aggregating the network events into event groups. Each event group is defined as a plurality of events which are in a specific sequence of event types. Each event group is classified into one of a plurality of event group types. The mid-level analytics may employ a pattern recognition algorithm such that the event groups are created when predefined patterns are recognized. The mid-level events timeline is rendered by a mid-level visualization module 15 into a visualization which may be displayed to a user via a graphical user interface.

Top-level analytics are then applied by a top-level analytics module 16 which has the role of creating a third time sequence from the second time sequence by aggregating the event groups into higher level event groups, which we refer to as super-groups to distinguish them from the mid-level analytics groups and to reflect the fact that they are supra-ordinate to the mid-level groups. Each event super-group is defined as a plurality of event groups which are in a specific sequence of event group types. Moreover, each event super-group is classified into one of a plurality of event super-group types. The top-level analytics may employ a pattern recognition algorithm such that the event super-groups are created when predefined patterns are recognized. The top-level events timeline is rendered by a top-level visualization module 17 into a visualization which may be displayed to a user via a graphical user interface.

Each of the three timelines are co-rendered by a multi-level visualization module 18 which combines the outputs of the individual visualization modules 13, 15, 17 so that the three levels of timeline are presented alongside each other in a single visualization of all three analytics levels, so that their juxtaposition allows for direct visual comparison by a domain expert user. In addition, to facilitate the visual interpretation at each analytics level, the rendering of the basic, mid and top level events is done in such a way that within each visualization level the different types are visually distinct from each other. The visualizations may create the timelines with events being color-coded (i.e. hue) by look up to a customizable color chart, and a quality measure being coded within each color by another color parameter (saturation or brightness in HSB, or saturation or luminosity in HSL). Alternatively, the quality measure value could be coded by opacity. The visualization may allow user customization, for example: a real-time sliding window view in which the user can set the time window to be visualized; zooming in or out in time after the session has finished; and enabling predefined time-warping techniques in which event types deemed to have higher importance are highlighted by extra horizontal (i.e. time axis) extension.

Any of the basic, mid and top level analytics may use automatic classification to classify the events, event groups and event super-groups respectively, wherein the automatic classification may use pattern recognition as described in any of the following publications, the entire contents of which are incorporated herein by reference:

S. Grauwin, S. Sobolevsky, S. Moritz, I. Gódor, C. Ratti—Towards a comparative science of cities: using mobile traffic records in New York, London and Hong Kong, Computational Approaches for Urban Environments, Springer, pages 363-387 (2015)

D. Kondor, P. Thebault, S. Grauwin, I. Gódor, S. Moritz, S. Sobolevsky, C. Ratti—A Tale of Many Cities—Visualizing Signatures of Human Activity in Cities Across the Globe, Landscape Architecture Frontiers, vol 3/3, pages 54-61, June 2015

I. Gódor, Z. Kallus, D. Kondor, S. Grauwin, S. Sobolevsky—The Signatures of City Life, Ericsson Mobility Report, pages 28-29, November 2014

I. Gódor, P. Jonsson, Z. Kallus, D. Kondor—The Digital Signatures of Sport, Ericsson Mobility Report, pages 20-23, June 2015

For example, if the neighborhood of a stadium is analyzed, then the typical daily pattern of the number of calls is quite different from the case when the stadium is hosting an event, such as a music concert or a sports event. A normal day, hosting a sporting event and hosting a music concert will each have their own distinct quality measure. The quality measure may be an amount of time that is needed for the stadium to fill with spectators or an amount of time needed for the spectators to leave the stadium after an event. Such a quality measure may be a scalar quantity which is continuously variable to reflect what proportion of the stadium capacity will be utilized, e.g. sell out to negligible ticket sales. The value of the quality measure will be different in case of music concerts of national and international stars, or local football matches and international cup matches as presented in, for example, the previously-mentioned publication: I. Gódor, P. Jonsson, Z. Kallus, D. Kondor—The Digital Signatures of Sport, Ericsson Mobility Report, pages 20-23, June 2015, the entire contents of which is incorporated herein by reference. The quality measure is useful to predict how the network should adapt to the identified pattern and whether and how the spreading of the event might be expected throughout the network beyond the neighborhood of the stadium.

The analysis is thus performed in a hierarchical manner to give three levels of network performance evaluation, by feeding the output time series as input for mid-level pattern detection and feeding the mid-level output as input for top-level pattern detection. The three resulting timelines are displayed together in a hierarchical diagram, e.g. a cake diagram. The pattern detection algorithm applied at the mid and top levels can be trained by experts and/or by applying machine learning to historic datasets.

We now further discuss the three levels of the hierarchical event analytics and visualization.

The first event analytics level is constituted by the events that have been logged in the network which may be actual events, i.e. raw network data, or pre-processed network data, e.g. the events may be peaks in particular actual events. We refer to these as basic events which form a basic timeline, e.g. from a single network node, being formed by events identified in the raw measurement stream or streams that have been collected for analysis. For example, the basic events may be a specific type of network event as seen on load measurements of a cell in the network.

The second event analytics level is constituted by specific basic event patterns which are each formed by specific combinations of types of basic events (from the first level). Each specific combinations of basic event types may be termed a mid-level event type.

The third event analytics level is constituted by specific mid-level event type patterns, i.e. specific combinations of mid-level event types, which may be termed top-level event types.

The raw measurements may come from a single stream or multiple streams which are combined into the first hierarchical event analytics level. Since the analytics levels and the multi-stream network data are functionally orthogonal to each other, we refer to the levels of the hierarchical event analytics as vertical levels and the tiers of combination of the network data (if present) as horizontal levels.

We introduce the combination of timelines in three horizontal levels as follows:

A simple mapping is creating event hierarchy using only a single node timeline.

A unified mapping is creating event hierarchy using the merged timelines of two or more nodes. This union is achieved by using the time ordering or matching of patterns and can be created on the basic or mid-level timelines.

A differential mapping is creating an event hierarchy where relative performance of two nodes or groups of nodes—e.g., local vs regional averages—for comparative study. Matching of patterns before differentiation can be useful to look for event-related performance, and simple time ordering to look for session-level performance comparison.

In summary, FIG. 1 shows the single-node timeline functions corresponding to the hierarchical event analytics and visualization method on three vertical levels. Basic analytics in module 12 is performed on the raw data received from module 10. The output from the basic analytics module 12 is provided to the basic level visualization module 13 and to the mid-level analytics module 14. Similarly, the output from the mid-level analytics module 14 is provided as input for mid-level visualization module 15 and the top-level analytics module 16. The three levels together serve to form the 3-level hierarchical visualization of a given node's (or group of nodes) performance timeline. Each created event timeline can serve as the basis of new pattern definition. New definitions can, in return, improve the respective analytics logic.

Figure 2:
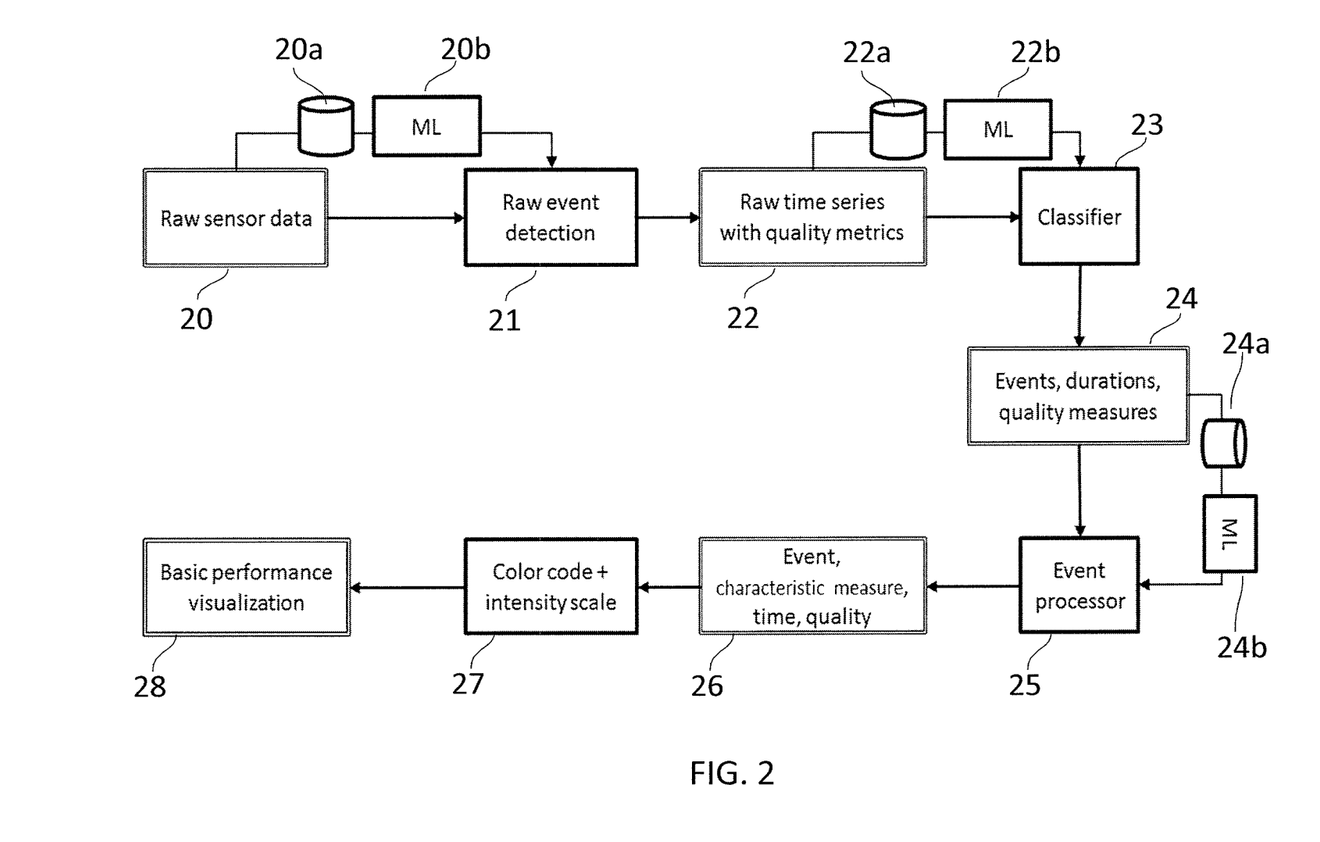
FIG. 2 shows aspects of the method and system of FIG. 1 in more detail.

FIG. 2 shows the workflow of the basic analytics module of FIG. 1 in more detail. Each box labeled "ML" is a machine learning (ML) algorithm module which applied its ML algorithm, based on pattern recognition, to the input data received as input to that analysis level. Each of the storage icons shows a reference database which at each hierarchical level has the role of hosting a reference database referenced by the ML algorithm during processing the data, and also of providing storage for the input data to that level and the output from the ML algorithm.

Time-stamped raw sensor data 20 from the network is received at a first analysis level and stored in a reference database 20a. With reference to the reference database 20a a ML module 20b processes the raw sensor data by using pattern recognition to detect raw events in the raw sensor data and produce a time series of raw events. The processed data is output to a raw event detection module 21.

Each raw event in the raw events time series is then transmitted to a quality metric addition module 22 and stored in a reference database 22a. With reference to the reference database 22a, a ML module 22b processes the raw event detection data to deduce one or more quality metrics from each event, or at least those events deemed to be significant for the particular analysis being performed (so-called use case). A quality metric is a discretely or continuously variable quantity that is a measure of goodness for performance. The quality metrics are then associated with the relevant raw event from which they have been derived.

The processed data comprising the raw events with their quality metrics are then supplied to an event classifier module 23 which applies pattern recognition to classify each event into one of a plurality of event types based on a performance quality measure. The classifier module 23 can be pre-configured with pre-defined event types or generate event types on the fly based on analyzing the raw event data and optionally also their associated quality metrics.

The event classifier outputs the time series, now appended with event classifications, to a duration measurement module 24 and stored in a reference database 24a. With reference to the reference database 24a, a ML module 24b processes the time series and event classifications so as to associate each event with a time span, i.e. duration. The processed data is output to an event processor module 25.

The event processor module 25 has the role of processing the time series data and associated data output from the multi-level analysis performed by the preceding stages in order to produce a characteristic measure (i.e. score) and performance quality indicators from the data. Namely, the event processor module 25 processes the multi-level analysis data from the preceding stages to add a performance quality measure to each event that is to be kept as a relevant event for the particular performance use case of interest. This performance quality is the final assessment of the characteristic measure (or score), i.e. it is characteristic of an event which has meaning in the context of the use case and also a time dependency.

In a visualization preset applicator 27 the events are color-coded, or otherwise visually tagged, according to event type. The events are additionally visually tagged according to the value of a quality measure by saturation or luminosity/brightness of the event-type color, or some other suitable visual tagging which is distinct from, and preferably complementary to, the event type visual tagging. Another alternative would be to use opacity as the visualization parameter.

This completes the pre-processing of the basic network data which can then be rendered into a visualization in a basic data time series visualization module 28 whose role it is to render the results of the event processing in a performance visualization, for example in real-time. The events with various scores at given times and associated time-dependent performance quality measures are parameters that the visualization module 28 can use for generating the visualization though suitable coloring, icon choice and so forth to generate the final GUI.

To interpret the visualization, the user, that is the person or persons tasked with evaluation and decision making based on their interpretation of the visualization, e.g. in a live system, need to know the performance quality measure (s) that are being rendered, but do not need any knowledge of how the analysis is performed in detail in order to be able to understand the visualization, e.g. to identify the root cause behind a current network problem, or to predict a future network problem, though the visualized timelines of events and their scores at the various levels.

In the above-described multi-level analysis, definition of event types may be pre-defined by an expert, or defined on-the-fly by the ML algorithm, or any combination of the two at any given analysis level. The proposed approach therefore permits a duality at each step of expert vs machine learning for definition of event types based on previously observed or expected patterns. The same point can also be made for the performance quality measures, i.e. they can be defined by experts in the field, or as part of the ML. At one extreme of this spectrum, the whole process can be pre-programmed by field experts using pre-defined event types, event quality measures and ultimately the resulting performance measure of the monitored system (calculated from events of various levels at specific times/places: put into context of the use case). At the other extreme, the implementation can heavily rely on automation where machine learning will find and define specific events and at most minimal settings of learning parameters are set by experts. In this latter case of ML-based detection, the learning can be performed on historic datasets and the learnt information can be used to fix the parameters that are used to process real-time data streams. Alternatively, the learning could be done in real-time on the real-time data streams, so that the analysis stages user real-time ML algorithms that learn and detect on the incoming data stream in parallel and continuously. The system can then improve its event detection and classification, and also define new event types, as more measured data is presented. With either approach, with any given definition of event types, the analysis has the task of identifying, i.e. detecting events, in the incoming data stream, e.g. in real-time, of the system being monitored. Further the analysis will compare the incoming data to, for example, a baseline, or predefined thresholds of quality measures, which are relevant in the system being monitored, where this analysis may take account of location and time when assigning a characteristic quality measure to each detected event. The events are then filtered based on the quality measure so that events that are deemed to be relevant, are tagged as such, since these will be the events that are taken forward by the process for visualization. Events filtered out may be retained despite their tagging as non-relevant, or may be deleted, or at least not passed on to the next processing stage. The quality measure is used as a score for placing the event on a quality scale that is to be used for performance evaluation of an expert via the visualization.

The workflow of FIG. 2 thus performs a number of tasks in series to create, from an input time series, a performance visualization timeline. These tasks can be summarized in order to be: pattern detection in time series of basic events identifying time and type of complex events in the raw data from the network; performance metric calculation of found complex events including event classification; and visualization according to timing, type and performance metrics.

Figure 3:
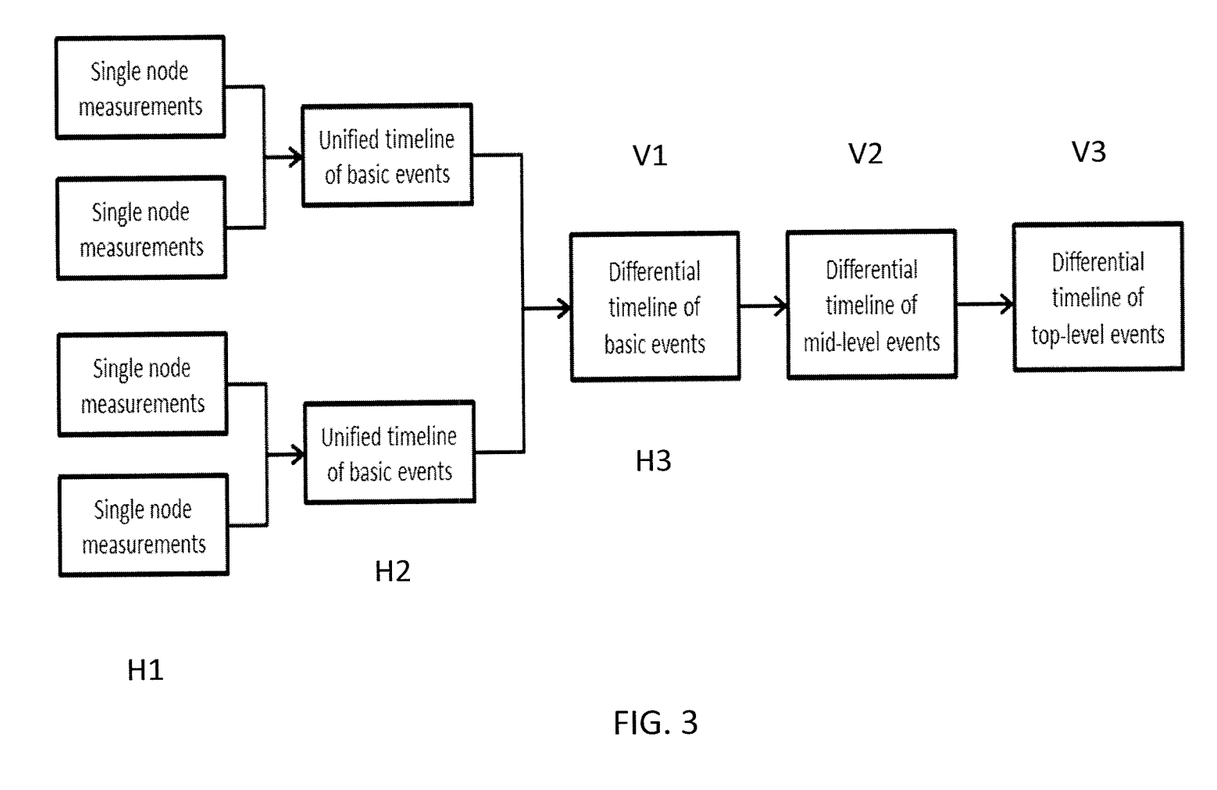
FIG. 3 shows an example of event types and data feeds with three vertical levels and three horizontal levels.

FIG. 3 shows an example of event types and data feeds with three vertical levels V1, V2, V3 and three horizontal levels H1, H2, H3 noting that the combined basic event data is both the top horizontal level H3 and the bottom vertical level V1. The horizontal level H1 could for example be single node measurements from individual UEs in neighboring cells, where the UE data from each cell is unified, so that in horizontal level H2 there is a unified timeline for each cell. The unified timelines of the basic events could then be processed to generate horizontal level H3 by differentiation to find peaks in the basic event activity. This peak data is then the data input to the hierarchical analysis, i.e. data set H3 is data set V1.

On each level events are characterized by basic parameters defining event type (e.g., a sudden network load variation which causes neighborhood adjustments) and event quality (e.g., characteristic timeline and area affected). The events, event groups and event super-groups are visualized in different colors through look up to a color coding chart and the quality measure by another color parameter or opacity as described above according to a scale defined by a preset. By a preset we mean a definition which maps a range of values of the quality measure to a range of values of the parameter used to visualize the quality measure, where the mapping may be linear or non-linear. The visualization is suitable to allow domain experts to make a performance evaluation, and also to recognize when new patterns occur.

A single node can be characterized based on summarized event quality over a linear timeline of a session. Differential mapping of the current timelines against stored historic timelines (or summaries thereof) can highlight trends in current performance.

A system of nodes can be analyzed by using unified mappings (i.e. mid level) and/or differential mappings (i.e. top level) where mid and top-level quality measures can be based on simple or relative requirements.

The basic 'horizontal' hierarchy level is the events coming from single nodes of the network. The mid-level groups events from related nodes, which may for example be: different cells of the same site, a given location/routing/tracking area, or the area of the base station controller (BSC) or radio network controller (RNC). That is, the spreading of an error can be identified both in temporal and spatial dimensions at the different 'horizontal' hierarchical levels. Examples of such errors are: a) topological errors even on physical or logical level, b) saturation of the network (which may be as detected in the user plane and/or the control plane), and c) user-specific errors which occur repetitively, e.g., in a given region of the network or in given time periods of the day, etc.

Definitions of new mid and top-level event groups and super-groups can be performed by the domain expert without any data engineering knowledge as the visual tool facilitates intuitive understanding by inspection. In addition, new groups and super-groups can be automatically proposed by self-learning pattern recognition algorithms to give a powerful combination of machine learning and domain expert knowledge. This in return facilitates the continuous updating of rule engines using the defined events for automating actions.

Outlier recognition by domain experts is similarly highly facilitated by the visual tool and its customization options. Furthermore, automated higher-level analytical tasks, such as prediction, prevention, or outlier detection can be performed using machine learning techniques on historical mid or top level timelines of nodes with similar functions.

Figure 4:
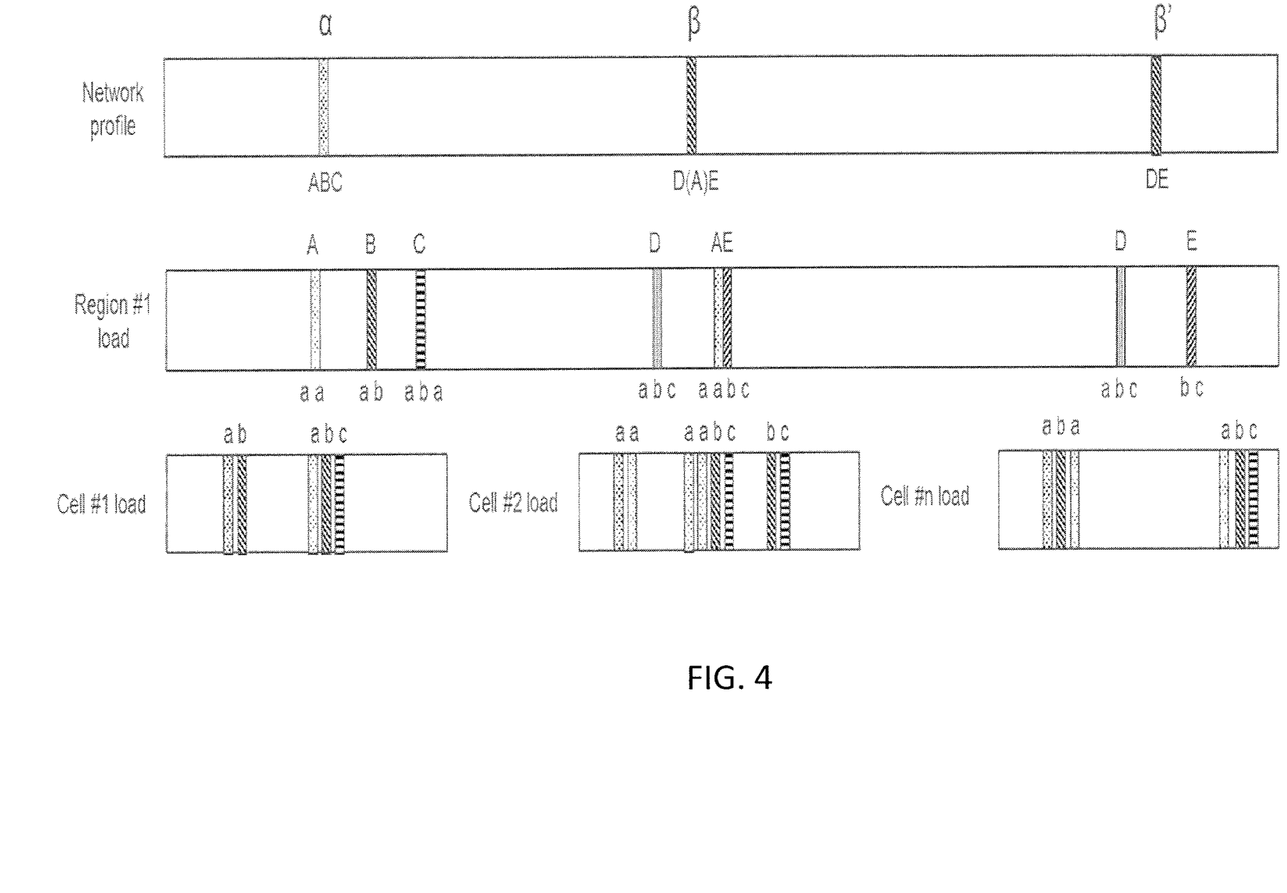
FIG. 4 shows a spatio-temporal hierarchical visualization of a multi-level network load variation analysis.

FIG. 4 shows a NOC-related example of spatiotemporal hierarchical visual analysis illustrating network load variation. We note that this illustration is an oversimplification in order to show the principles and has three analysis levels. In other embodiments, four or more analysis levels could be provided. With reference to FIG. 4, we now describe a specific embodiment which shows telecommunication event analytics for network operation monitoring. The time evolution of network loading is visualized with timelines at three levels: local (one cell), regional (group of cells) and network.

Level 1: On a cell level, one can imagine how different the daily profile could be depending on the land use of the given area (like school districts, office districts or residential areas). In the particular example, the components of cell load come from:
    a—peaks coming from students
    b—peaks coming from offices
    c—peaks coming from homes Level 2: However, how cell load is reflected in the total network traffic, when the load variation can be considered as normal or typical, is completely hidden without the hierarchical analysis. In the particular example, the components of regional load come from:
    A—students (seen in the morning and at noon)
    B—mix #1 of students and offices (seen in the morning)
    C—mix #2 of students and offices (seen in the morning)
    D—mix of all types (seen at noon and in the afternoon)
    E—mix of offices and homes (seen at noon and in the evening)

Level 3: In the above artificial example, one can notice that there are only two major types of load intensity variations directly connected to the behavior of different regions and cells in them. In the particular example, the components of regional load come from:
    α—morning pattern (mix of A, B and C)
    β—noon pattern (mix of D, A and E)
    β'—afternoon/evening pattern (mix of D and E)

Based on that, a domain expert can understand what the impact would be, if one of the elementary patterns were changed and how the changed pattern would propagate through the hierarchy of the network system.

Once similar connections have been recognized by domain experts, network monitoring systems can learn what the normal behavior of the network is, when the network should be upgraded to handle traffic increase tendencies. Also, the network can be managed to react to events that are identified by a detected pattern of increased traffic in given cells or regions, where the detected pattern is known to be characteristic of a certain event, e.g. a football match at a stadium or marathon running in a city, which is known from historical data to result in a spatial spread through the network as a large crowd gathers and disperses, e.g. at a football stadium or along a marathon route. In the case of a marathon, some of the crowd will follow the route and "pop up" at major milestones along the route.

Since an event in the context of the present method and system is a specific pattern in the measured or deduced timeline of the monitored system, it will be appreciated that the crowd associated with an event will display certain patterns, and so can be classified at different analysis levels into "events". In the specific example of a football match in a large stadium, monitoring mobile phone usage will produce a characteristic timeline as follows: slow buildup until start of match, sudden fall at the start, large peak in the half-time break, sudden fall at start of second half, sudden and significant rise at the end of match, and slow fall after the end of the match as the crowd disperses from the area. This timeline, which has a sequential pattern that will be true for all football matches in any stadium, can thus be classified into a sequence of events characteristic of the staging of a football match at a stadium.

However, within this pattern, every football match will be different in its detail, such as unpredictable local maxima in network activity each time a goal is scored, different kick off times, different rate of crowd dispersal after the match, different ratio of half-time peak vs start or end peaks, different total call volumes and so forth. These variations within the pattern are what become quality measures in the analysis. Quality measure could be set to provide an entertainment value of the match, e.g. factoring in number of goals, quantity and magnitude of peaks of call activity. Quality measure could be set to provide an importance value of the match, e.g. how big was the crowd, did significant number of fans congregate outside the stadium during the match? Was the area affected focused on the small location of the stadium itself, or did it (or is it) affecting service demand away from the stadium, etc.

The visualization could present pixels covering different areas with an opacity which scales with usage volume in that area, or how current usage differs from expected usage for a recognized event type, e.g. a city marathon or sports event at a particular stadium, e.g. as known from previous times the same event type was recognized at the same location. Once the analysis understands what is the normal behavior on the different hierarchical levels, in case of special occasions, like a football match or a city marathon, the network level (level 3) visualization allows traffic volumes at the lowest, cell level to be predicted, so that these cells can be prepared to host the predicted extra traffic.

As will now be understood, characterization of performance is possible from the visualization as shown by way of example in FIG. 4.

Having described various embodiments of the disclosure, it will be understood that the proposed computer system and method relates to processing telecommunications network usage data to generate performance analytics visualizations. It can be used to visualize a series of events identified during a session. It is suitable for various domains where performance is related to ordering and timing of specific event configurations, and pattern recognition is useful for evaluation of performance. Variations and hierarchical pattern formation, differential and unifying views are also proposed. Using input from real-time data streams, the proposed visualizations make it easy to recognize complex patterns at a glance. In particular, the proposed visualizations are suitable for users who are experts of the underlying telecommunications network, and thus have expensive domain knowledge, but who are not necessarily experts either in analytics or the reporting system which collected the network data.

The multi-level pattern embedded in the proposed visualization can enable a domain expert to make an intuitive visual evaluation of performance during a session. The timelines of different network entities, such as nodes or cells, can be presented alongside each other in a single view to allow for direct visual comparison. The visualization facilitates detection of trends, patterns, or anomalies in a series of events which in turn may facilitate improvement of existing rule engines. The proposed visualizations are also adaptable to any domain where a series of events reoccurs in a dynamical manner, e.g. the morning or evening rush hour, or when a stadium hosts concerts or sporting events. The proposed analysis is usable as part of a real-time reporting system to monitor how events are unfolding, as well being useable for analyzing historical data sets.

The proposed implementations can easily be integrated into cloud-based measurement platforms. Spatially distributed systems inherently need common data analytics solutions where unified view and comparative studies can be created of merged datasets.

Figure 5:
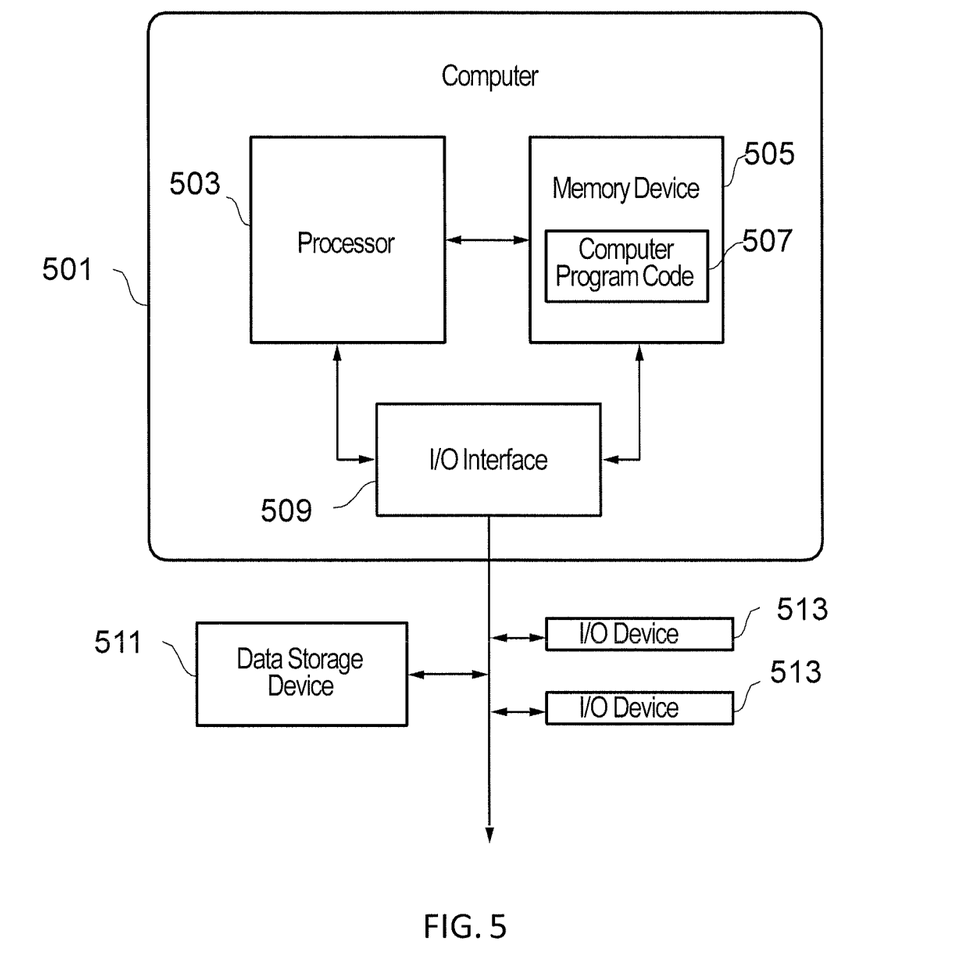
FIG. 5 shows a structure of a computer system and computer program code that may be used to implement the disclosed methods.

FIG. 5 shows a structure of a computer system and computer program code that may be used to implement any of the disclosed methods.

In FIG. 5, computer system 501 comprises a processor 503 coupled through one or more I/O Interfaces 509 to one or more hardware data storage devices 511 and one or more I/O devices 513 and 515. Processor 503 may also be connected to one or more memory devices or memories 505. At least one memory device 505 contains stored computer program code 507, which is a computer program that comprises computer-executable instructions. The stored computer program code includes a program that implements the method and method aspects presented herein. The data storage devices 511 may store the computer program code 507. Computer program code 507 stored in the storage devices 511 is configured to be executed by processor 503 via the memory devices 505. Processor 503 executes the stored computer program code 507.

Memory 505 may comprise any known computer-readable storage medium, which is described below. In one implementation, cache memory elements of memory 505 provide temporary storage of at least some program code (e.g., program code 507) in order to reduce the number of times code needs to be retrieved from bulk storage while instructions of the program code are carried out. Moreover, similar to CPU 503, memory 505 may reside at a single physical location, comprising one or more types of data storage, or be distributed across a plurality of physical systems in various forms.

I/O interface 509 comprises any system for exchanging information to or from an external source. I/O devices 513, 515 comprise any known type of external device, including a display device (e.g., monitor), keyboard, etc. A bus provides a communication link between each of the components in computer system 501, and may comprise any type of transmission link, including electrical, optical, wireless, etc. I/O interface 509 also allows computer system 501 to store information (e.g., data or program instructions such as program code 507) on and retrieve the information from computer data storage unit 511 or another computer data storage unit (not shown). Computer data storage unit 511 may comprise any known computer-readable storage medium. For example, computer data storage unit 511 may be a non-volatile data storage device, such as a semiconductor memory, a magnetic disk drive (i.e., hard disk drive) or an optical disc drive (e.g., a CD-ROM drive which receives a CD-ROM disk).

An implementation of the present disclosure may take the form of a computer program product embodied in one or more computer-readable storage medium(s) (e.g., memory 505 and/or computer data storage unit 511) having computer-readable program code (e.g., program code 507) embodied or stored thereon.

Program code (e.g., program code 507) embodied on a computer-readable medium may be transmitted using any appropriate medium, including but not limited to wireless, wireline, optical fiber cable, radio frequency (RF), etc., or any suitable combination of the foregoing.

Figure 6:
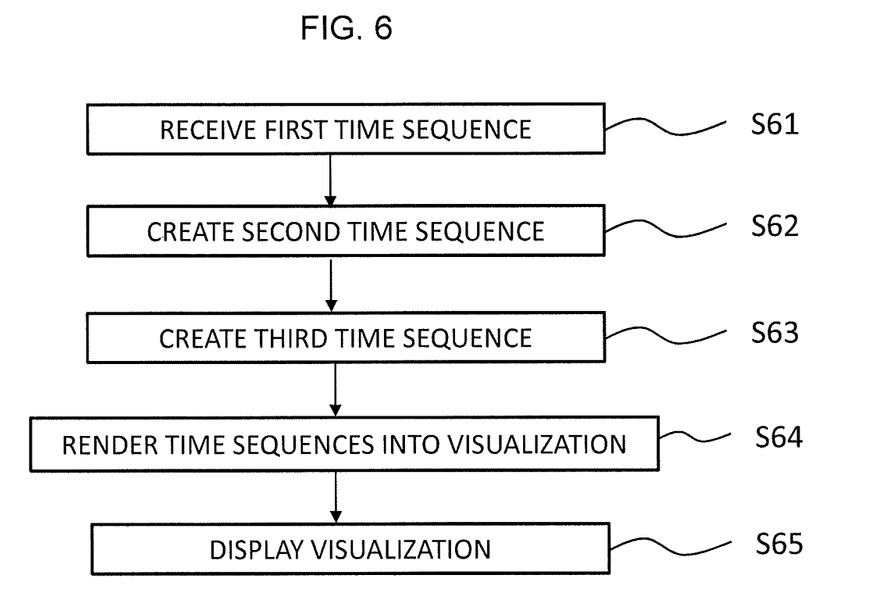
FIG. 6 is a flow diagram of an embodiment of a computer-automated method of an embodiment of the disclosure for analyzing network performance data.

FIG. 6 is a flow diagram of an embodiment of the above-described computer-automated method for analyzing network performance data.

In Step S61, there is received a data set containing a log of a first time sequence of network events in which each network event is associated with at least one network location and has been classified into one of a plurality of event types.

In Step S62, there is created a second time sequence from the first time sequence by aggregating the events into event groups, wherein each event group is defined as a plurality of events which are in a specific sequence of event types, each event group being classified into one of a plurality of event group types.

In Step S63, there is created a third time sequence from the second time sequence by aggregating the event groups into event super-groups, wherein each event super-group is defined as a plurality of event groups which are in a specific sequence of event group types, each event super-group being classified into one of a plurality of event super-group types.

In Step S64, there is rendered into a visualization some desired combination of the first time sequence, the second time sequence and the third time sequence such that in the visualization each of said types is visually distinct from other types in the same time sequence. If all combinations are rendered, then a desired combination can be picked out by a user when the visualization is displayed.

In Step S65, the visualization is displayed on a display.

Figure 7:
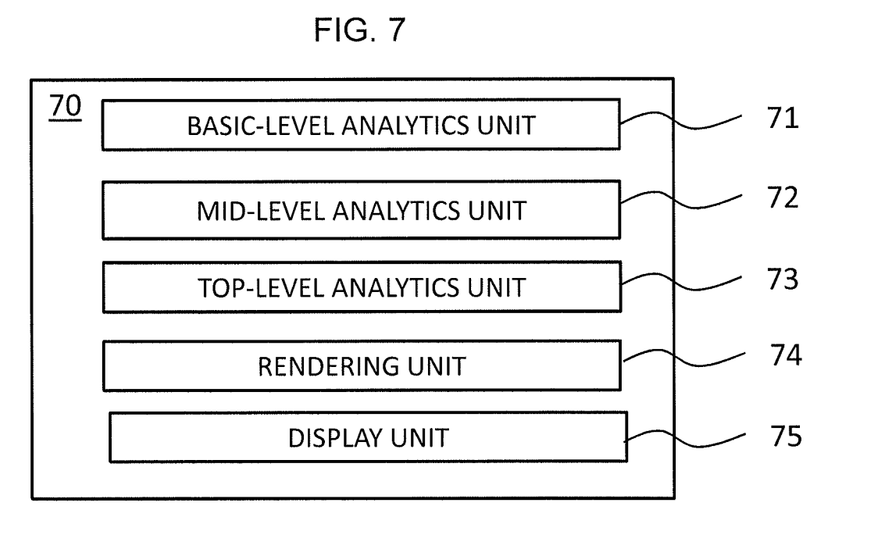
FIG. 7 is a block schematic diagram showing a computer system of an embodiment of the disclosure configured to analyze network performance data.

FIG. 7 is a block schematic diagram showing a computer system 70 of an embodiment of the disclosure configured to analyze network performance data.

A basic-level analytics unit 71 is configured to pre-process input network performance data to generate a data set containing a log of a first time sequence of network events in which each network event is associated with at least one network location and has been classified into one of a plurality of event types.

A mid-level analytics unit 72 is configured to create a second time sequence from the first time sequence by aggregating the events into event groups, wherein each event group is defined as a plurality of events which are in a specific sequence of event types, each event group being classified into one of a plurality of event group types.

A top-level analytics unit 73 is configured to create a third time sequence from the second time sequence by aggregating the event groups into event super-groups, wherein each event super-group is defined as a plurality of event groups which are in a specific sequence of event group types, each event super-group being classified into one of a plurality of event super-group types.

A rendering unit 74 is operable to render into a visualization a desired combination of the first time sequences, the second time sequence and the third time sequence such that in the visualization each of said types is visually distinct from other types in the same time sequence. If all combinations are rendered, then a desired combination can be picked out by a user when the visualization is displayed.

A display unit 75 is configured to receive the rendered visualization and display it for a user.

It is believed that the advantages of the technique presented herein will be fully understood from the foregoing description, and it will be apparent that various changes may be made in the form, constructions and arrangement of the exemplary aspects thereof without departing from the scope of the disclosure or without sacrificing all of its advantageous effects. Because the technique presented herein can be varied in many ways, it will be recognized that the disclosure should be limited only by the scope of the claims that follow.

The invention claimed is:

1. A computer-automated method for analyzing network performance data, the method comprising:
   receiving a data set containing a log of a first time sequence of network events in which each network event is associated with at least one network location and has been classified into one of a plurality of event types;
   creating a second time sequence from the first time sequence by aggregating the events into event groups, wherein each event group is defined as a plurality of events which are in a specific sequence of event types, each event group being classified into one of a plurality of event group types;
   creating a third time sequence from the second time sequence by aggregating the event groups into event super-groups, wherein each event super-group is defined as a plurality of event groups which are in a specific sequence of event group types, each event super-group being classified into one of a plurality of event super-group types;
   generating a Graphical User Interface (GUI) to include a visualization of at least one of the time sequences such that in the visualization, each of the types is visually distinct from other types in the same time sequence; and
   sending the GUI to a display device for display to a user.

2. The method of claim 1, wherein the visualization includes a map representation in relation to the network locations and according to at least one of the second time sequence and the third time sequence.

3. The method of claim 1, further comprising:
   recognizing a pattern in the data set by matching the current event groups and/or super-groups to a first time period of at least one stored data set in which the same event groups and/or super-groups are present; and
   predicting future network loading based on warping the first time period of the at least one stored data set onto the current data set and using the warped second time period of the at least one stored data set as the prediction.

4. The method of claim 3, wherein the visualization includes a map representation of the predicted future network loading.

5. The method of claim 2, wherein the map representation encodes time with color and/or shading in a single image frame, and such that separate image frames relate to specific times or periods of time which can be displayed in time order.

6. The method of claim 2, further comprising modifying the map representation to filter in and out based on event types, event group types, and/or event super-group types in response to input from user actuatable controls.

7. The method of claim 1, further comprising modifying the visualization of the first time sequences, the second time sequence, and/or the third time sequence to filter in and out based on event types, event group types, and/or event super-group types in response to input from user actuatable controls.

8. The method of claim 6, further comprising:
   predicting future network loading based on applying the input from the user actuatable controls to filter out at least some of the events contained in the data set; and
   saving a modified version of the data set with the events which have been filtered out from the visualization being removed.

9. The method of claim 3, further comprising:
comparing the predicted future network loading to network capacity to predict any capacity shortfalls; and
provisioning additional network capacity to address any such capacity shortfalls before they are predicted to occur.

10. The method of claim 1, wherein the location is a geographical location and/or an association with a network entity in a network diagram.

11. The method of claim 1, wherein the event group types are predefined.

12. The method of claim 1, wherein the event group types are defined as part of creating the second time sequence from the first time sequence and according to the first time sequence.

13. The method of claim 1, wherein the event super-group types are predefined.

14. The method of claim 1, wherein the event super-group types are defined as part of creating the third time sequence from the second time sequence and according to the second time sequence.

15. The method of claim 1, wherein in each time series each type is ascribed a different visual characteristic for the visualization.

16. The method of claim 1:
wherein each event is ascribed a value of a quality parameter; and
wherein the visualization represents a range of the quality parameter values by a range of values of a visualization parameter.

17. The method of claim 1, further comprising creating at least one higher order time sequence from the time sequence of the previous highest order by aggregating the groups of the previous highest order, referred to as sub-ordinate groups, into supra-ordinate groups, wherein each supra-ordinate group is defined as a plurality of sub-ordinate groups which are in a specific sequence of sub-ordinate group types, each supra-ordinate group being classified into one of a plurality of event supra-ordinate group types.

18. A non-transitory computer readable recording medium storing a computer program product for controlling a computing device for automated analyzing of network performance data, the computer program product comprising software instructions which, when run on processing circuitry of the computing device, causes the computing device to:
receive a data set containing a log of a first time sequence of network events in which each network event is associated with at least one network location and has been classified into one of a plurality of event types;
create a second time sequence from the first time sequence by aggregating the events into event groups, wherein each event group is defined as a plurality of events which are in a specific sequence of event types, each event group being classified into one of a plurality of event group types;
create a third time sequence from the second time sequence by aggregating the event groups into event super-groups, wherein each event super-group is defined as a plurality of event groups which are in a specific sequence of event group types, each event super-group being classified into one of a plurality of event super-group types;
generate a Graphical User Interface (GUI) to include a visualization of the time sequences such that in the visualization each of the types is visually distinct from other types in the same time sequence; and
send the GUI to a display device for display to a user.

19. A computer system for analyzing network performance data, the system comprising:
a data input operable to receive a data set containing a log of a first time sequence of network events in which each network event is associated with at least one network location and has been classified into one of a plurality of event types;
memory operable to store the data set;
processing circuitry operable to analyze the data set by:
creating a second time sequence from the first time sequence by aggregating the events into event groups, wherein each event group is defined as a plurality of events which are in a specific sequence of event types, each event group being classified into one of a plurality of event group types;
creating a third time sequence from the second time sequence by aggregating the event groups into event super-groups, wherein each event super-group is defined as a plurality of event groups which are in a specific sequence of event group types, each event super-group being classified into one of a plurality of event super-group types;
generating a Graphical User Interface (GUI) to include a visualization of at least one of the time sequences such that in the visualization each of the types is visually distinct from other types in the same time sequence; and
an output operable to output the GUI including the visualization to a display.

* * * * *